March 24, 1970  P. N. ERICKSON ET AL  3,502,887

CARBON MONOXIDE DETECTOR FOR AUTOMOTIVE VEHICLES

Filed Feb. 26, 1968

Paul N. Erickson
Richard J. Jordan
INVENTORS

BY *Clarence A. O'Brien*
and *Harvey B. Jacobson*
Attorneys

United States Patent Office 3,502,887
Patented Mar. 24, 1970

3,502,887
CARBON MONOXIDE DETECTOR FOR AUTOMOTIVE VEHICLES
Paul N. Erickson, Detroit, and Richard J. Jordan, Roseville, Mich., assignors to General Marine, Inc., a corporation of Michigan
Filed Feb. 26, 1968, Ser. No. 708,042
Int. Cl. G01n 21/26
U.S. Cl. 250—218                                   5 Claims

ABSTRACT OF THE DISCLOSURE

A detector for gaseous material, particularly carbon monoxide, incorporating structural components enabling effective installation in an automotive vehicle, such as an automobile or the like for providing a warning to occupants of the vehicle when the concentration of gaseous material reaches a predetermined level. The detector is in the configuration of a cigarette lighter including a pull-out unit to enable replacement of the sensing element which serves to occlude a photoelectric cell assembly when the elevel of gaseous material reaches a predetermined level.

---

The present invention relates to a detector for gaseous material, particularly carbon monoxide, constructed in the shape and configuration of a conventional cigar or cigarette lighter for mounting on the dash panel or other convenient area in the interior of a vehicle such as an automotive vehicle or the like. The structure disclosed in this application represents certain improvements, refinements and modifications appearing in our copending application, Ser. No. 565,209, filed July 14, 1966 for Carbon Monoxide Detector, now Patent No. 3,445,669.

The interior of the vehicles such as passenger automobiles, buses, trucks and the like which are powered by internal combustion engines, frequently have a high level of carbon monoxide therein due to various factors such as inadequate exhaust systems or the like. In travelling with a vehicle closed, there may be considerable seepage of carbon monoxide into the interior of the vehicle which sometimes causes drowsiness which results in accidents and it is a primary object of the present invention to provide a carbon monoxide detector which is simply and easily installed on the instrument panel or dashboard of an automotive type vehicle so that a warning may be given to the operator or occupants of the vehicle so that when the carbon monoxide concentration reaches a predetermined level, the warning device will be activated.

A further object of the present invention is to provide a carbon monoxide detector having a photoelectric cell together with a sensing element which will occlude the photoelectric cell when the opacity thereof is altered when exposed to carbon monoxide of a particular concentration. Such occlusion also activates a signalling device such as a warning light, audible signal or an equivalent signalling device to warn the operator or passengers of the vehicle of the condition so that remedial action may be taken.

A further object of the present invention is to provide a carbon monoxide detector constructed in the form of a cigarette or cigar lighter with a pull-out unit to enable replacement of the sensing element or other components of the detector with the detector being preferably mounted in a recessed manner on the dashboard to enable ready observation thereof and at the same time eliminating any projections from the dashboard.

Still another object of the present invention is to provide a carbon monoxide detector in accordance with the preceding objects in which the structure includes air inlet holes and outlet holes associated with the sensing element and photoelectric cell so that the heat of the bulb component of the photoelectric cell will cause convection air flow past and over the sensing element. The sensing element is also associated with the bulb in such a manner, that the heat from the bulb will increase the sensitivity of the sensing element. The detector is connected with the electrical system of the vehicle in a conventional manner and may be supported from the dashboard in substantially the same manner as cigarette lighters or other devices normally mounted on the dashboard.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
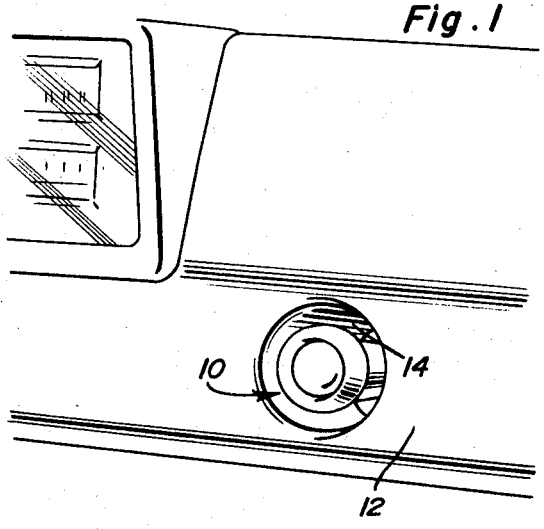
FIGURE 1 is a perspective view of the carbon monoxide detector of the present invention, illustrating the manner in which it is mounted on the dashboard of an automobile.
Figure 2:
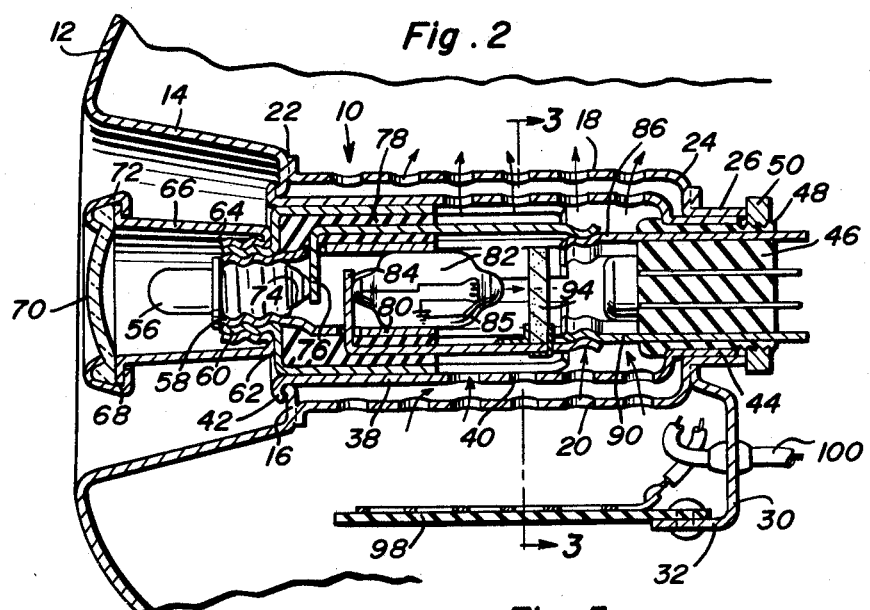
FIGURE 2 is a longitudinal, sectional view of the carbon monoxide detector illustrating the structural details thereof.
Figure 5:
FIGURE 5 is a plan view of another type of sensing element in the form of a circular disk having outwardly extending projections at each side thereof.
Figure 4:
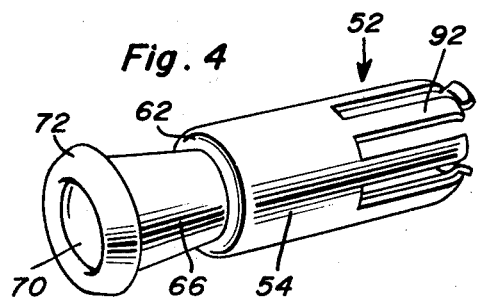
FIGURE 4 is a perspective view of the pull-out unit forming a portion of the detector.

Referring now specifically to the drawings, the carbon monoxide detector of the present invention is generally designated by the numeral 10 and is illustrated as being mounted on a conventional automobile dashboard 12 having an inwardly extending offset portion 14 terminating in an inwardly extending flange 16 which is apertured to receive the carbon monoxide detector 10. As illustrated in FIGS. 1 and 2, the outer end of the carbon monoxide detector 10 is either recessed inwardly of the outer surface of the dashboard 12 or, at least, does not project outwardly beyond the dashboard 12 to eliminate any projections on the dashboard. In addition, the carbon monoxide detector 10 may be mounted in various positions on the dashboard or may be mounted in any suitable location on an instrument panel or other mounting panel found in various types of vehicles.

The carbon monoxide detector 10 includes an outer cylindrical housing 18 having a plurality of holes 20 in the periphery thereof which may be either concentrated at the bottom and top thereof or positioned circumferentially thereof with the holes 20 at the bottom being generally referred to as air inlet holes and the holes at the top being referred to as air outlet holes.

One end of the tubular housing 18 is provided with an outwardly extending flange 22 in abutting engagement with the inwardly extending flange 16. The tubular housing 18 also includes an inwardly extending flange 24 at the end thereof opposite from the flange 22 with the flange 24 terminating in an axial extension 26. The flange 26 extends through a depending bracket 30 which is mounted rigidly therewith and terminates in an inturned flange 32.

Extending concentrically within the housing 18, there is provided an inner casing 38 having holes 40 therein for alignment with or operative association with the holes 20 to enable air passage into the interior of the casing 38. The outer end of the casing 38 is provided with an outwardly extending and reversely curved flange 42 engaging the flange 16 in opposed relation to the flange 22 on the housing 18 for mounting the housing 18 and casing 38 on the flange 16. The opposite end of the casing 38 is provided with an inwardly extending flange having an axial sleeve extension 44 received within the axial extension 26 on housing 18. A grommet or bushing 46 of insulating material is fixedly connected to sleeve 44 and is provided with external screw-threads 48 formed therein for screwthreaded engagement with a clamp nut 50 which abuts extension sleeve 26 on the housing 18 thus serving to clampingly engage the flange 16 between the flanges 22 and 42 by threading the nut 50 inwardly in a manner to move the flanges 22 and 42 toward each other.

Telescopically received within the casing 38 is a pull-out unit generally designated by the numeral 52 which includes a casing or housing 54 of cylindrical configuration for frictional engagement with the inner surface of a casing 38. Disposed within the casing 54 is a warning light bulb 56 having a screwthreaded base or other suitable mounting base received in the screwthreaded socket 58. The screwthreaded socket 58 is received in a similarly threaded member 60 which forms an integral and inwardly offset extension 62 of the casing 54. Also mounted on the flange 60 externally thereof is a screwthreaded flange 64 forming an integral and reversely bent portion of an extension 66 which encloses the warning light bulb 56. The extension 66 includes an outwardly extending flange 68 having a transparent lens 70 resting thereagainst. A retaining ring 72 engages the flange 68 and the outer edge of the lens 70 for retaining the lens 70 in position with the transparent lens 70 enabling visual observation of the light bulb 56. The screwthreaded connection between the flange 64 and the flange 60 enables removal of the extension 60 to enable replacement of the light bulb 56 when desired.

The base of the light bulb 56 is provided with the usual contact 74 which is engaged with a contact member 76 which is embedded in insulation material 78 covering the inner surface of the casing 54 to insulate the contact member 76 from the casing 54. The flange 58 is at the outer end of a cylindrical extension 80 which is engaged with the inner surface of the insulation material 78 but the contact member 76 extends through a suitable opening therein so that the contact member 76 will be insulated from the base of the bulb 56 which conventionally forms the other contact for completing a circuit through the bulb in a known manner.

Supported within the extension 80 is a bulb 82 forming a portion of a photoelectric cell assembly which has the forward end thereof in electrical contact with a contact member 84 which is embedded in the insulation material 78 on the opposite side thereof from the contact member 76 and which also extends through a suitable opening in the cylindrical flange 80 which frictionally retains the bulb 82. The other contact 85 on the bulb 82 is in electrical contact with the flange 80 thus serving to complete the circuit through the bulb 82 in a conventional manner. The contact 76 is in engagement with a contact member 86 which is mounted in the grommet 46. A sensing element or pickup 88 of the photoelectric cell assembly is mounted on grommet 46 so that as long as the photoelectric bulb 82 impinges light upon the pickup 88, electrical energy will be supplied to the bulb 56 by an electronic circuit. In the event of occlusion of the photoelectric bulb 82, then the sensing element 88 will cause the supply of electrical energy to the bulb 56 to be broken thus warning the operator of this condition.

The contact 84 is in engagement with the contact element 90 which is connected with a source of electrical energy for supplying electrical energy to the bulb 82 at all times. The connection between the contacts 76 and 86 and 84 and 90 is in the form of a spring detent in which outward or inward force on the handle 66 will enable the pull-out unit 52 to be inserted or removed. The fact that the light is illuminated at all times during safe operating conditions eliminates the possibility that the warning device would be rendered inoperative by failure of the light bulb 56. In other words, even though the light bulb 56 may be the cause of the operator being warned, this eliminates any possibility of the failure of the light bulb rendering the warning device inoperative.

As illustrated, the casing 54 has the inner end thereof divided into a plurality of fingers 92 to facilitate frictional engagement with the casing 38 and the contact elements 76 and 84 are also in the form of spring fingers which enables circulation of air between the electric bulb and the pickup 88 caused by the heat created by the bulb 82 serving to act as means for producing a chimney or thermosiphoning effect where convection air currents will circulate the ambient atmosphere through the interior of the detector 10.

Figure 6:
FIGURE 6 is a plan view of yet another type of sensing element in the form of a polygonal disk or wafer.

Disposed between the photoelectric cell bulb 82 and the sensing element or pickup unit 88 is a detector disk 94 which is circular in configuration to be telescopically received between the contact fingers for frictionally retaining the sensing disk 94 in place. The disk 94 is provided with a pair of projecting ears 96 which are received between the fingers for securely positioning the disk in place. Any suitable means may be provided for detachably securing the disk in position between the photoelectric cell bulb 82 and the sensing element 88. The sensing disk 94 is relatively transparent or translucent to enable passage of light from the lightbulb 82 to the sensing element 88 when the ambient air is free of carbon monoxide or whatever gaseous material is being detected. As long as the sensing disk is transparent or translucent, the light passing therethrough will be sensed by the sensing element 88 to retain the safe light 56 energized. However, when carbon monoxide impinges upon or passes over or otherwise comes into contact with the sensitive disk, the sensitive disk will turn dark and the opacity of the sensitive disk will increase thus occluding the sensing cell 88 so that the sensing cell will cut-off the safe light 56. Any suitable electrical circuitry may be provided such as the printed circuit board 98 and suitable wiring 100 connected with the electrical system of the vehicle. While a light has been employed as a warning device, other types of warning devices or signal devices may be employed such as a horn, buzzer or the like which will be energized when the sensing element 88 is occluded. As illustrated in FIG. 6, other types of sensing disks 102 may be provided in the form of rectangular or square plates having outwardly extending projections 104 to adapt the disk to the internal shape of the structure which supports the disk.

As will be apparent, the pull-out device may be easily removed and reinserted to enable replacement of the sensitive disk 94 and the bulb 56 may also be easily replaced. Also, the photoelectric bulb 82 may be easily replaced as may be necessary thus providing an inexpensive warning device which may be easily maintained in operative condition to indicate a dangerous condition in which a predetermined concentration of carbon monoxide is present in the air. The sensitive disk makes use of established chemical reactions that react to turn a chemical compound from a light color to a dark or black color upon exposure to carbon monoxide. The light beam is projected through the unactivated chemical compound in the sensing disk and the transmitted light strikes the face of the photoelectric sensing element whose resistance is a function of the amount of light striking it. Impingement of carbon monoxide on the chemical compound in the sensing disk reacts to cause the chemical compound to darken thus causing an increase in resistance of the cell in the same manner as described in our copending application. The components are oriented so that the heat of convection from the bulb will induce the chimney action with the warm air rising through the casing drawing outside air up through the detector over the sensitive disk in substantially a continuous draft. The heat from the bulb also acts as a catalyst on the chemical compound causing it to be more sensitive to carbon monoxide and to react quicker to its presence.

Figure 3:
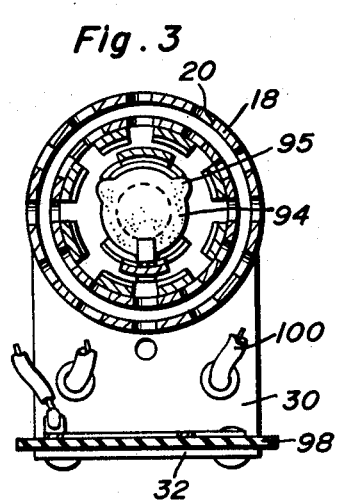
FIGURE 3 is a transverse, sectional view taken substantially upon a plane passing along section line 3—3 of FIGURE 2 illustrating further structural details of the detector.

The disk 94' illustrated in FIG. 3 includes a plurality of projections 95 which are equally spaced about the periphery to engage the supporting and gripping fingers.

The foregoing is considered as illustrative only of the principles of the invention. Further, since numerous modifications and changes will readily occur to those skilled in the art, it is not desired to limit the invention to the exact construction and operation shown and described.

What is claimed as new is as follows:

1. A carbon monoxide detector for use in a vehicle subject to an unsafe level of carbon monoxide in the ambient air comprising a tubular housing having a plurality of perforations therein adapted to be mounted substantially flush with a mounting panel in exposed relation to the ambient atmosphere, a pull-out member telescopically received within said housing and including openings to enable passage of ambient air, a warning device mounted in said pull-out member, a photoelectric cell assembly including a lamp disposed in said pull-out member and oriented in the flow path of air to heat the air and provide upward movement thereof for inducing air flow through the housing and pull-out member, said assembly also including a sensing element spaced from the lamp and mounted on the housing for normally receiving light impinged thereon, and a sensitive disk mounted on the pull-out member and disposed between the sensing element and lamp and in the flow path of ambient air passing through the housing, said disk increasing in opacity upon impingement of carbon monoxide contaminated air to occlude the sensing element of the photoelectric cell assembly, said tubular housing including contact elements for the photoelectric lamp and the warning device, said pull-out member including spring fingers releasably engaging said contact elements, said sensitive disk being releasably retained by said spring fingers to enable replacement thereof when desired.

2. The structure as defined in claim 1 wherein said warning device is in the form of a light bulb, said pull-out member including a transparent lens overlying the light bulb to enable the warning light bulb to be observed by occupants of a vehicle.

3. The structure as defined in claim 2 wherein said pull-out member is cylindrical and longitudinally elongated and generally in the configuration of a conventional cigar or cigarette lighter employed in vehicular structures.

4. A device for use in an enclosure subject to contamination of the ambient atmosphere by a gaseous material, said device comprising a photoelectric cell assembly including a light source and a light sensitive cell disposed in the path of light emitted by the light source, a light permeable member disposed in the light path between the source and cell, said member being characterized by an increase in opacity when subjected to the contaminant gaseous material in the atmosphere, said light source being disposed adjacent said member whereby the heat from the light source increases the sensitivity of the member and provides convection flow of ambient atmosphere past the member, and signal means operated in response to a predetermined opacity of said light permeable member to occlude the light from the cell, said assembly being disposed within a tubular housing having inlet and outlet passages for ambient atmosphere, and means mounting said tubular housing in the instrument panel of a vehicle powered by a prime mover emitting the gaseous material as a waste product.

5. The structure as defined in claim 4 wherein said mounting means includes a hollow casing removably and telescopically receiving said housing and including passages for ambient atmosphere whereby the housing and assembly may be removed for replacement of parts, said signal means including a light mounted in the outer end of the housing to enable observation thereof.

References Cited

UNITED STATES PATENTS

| 2,270,564 | 1/1942 | Schroeder | 219—264 X |
| 2,537,028 | 1/1951 | Cahusal et al. | 250—218 |
| 3,276,004 | 9/1966 | Mayo | 340—237 |
| 3,312,826 | 4/1967 | Finkle | 250—218 |

WALTER STOLWEIN, Primary Examiner

U.S. Cl. X.R.

219—269; 250—226